United States Patent
Buckley

(10) Patent No.: US 8,665,284 B2
(45) Date of Patent: Mar. 4, 2014

(54) FRAGMENTING IMAGE FILES SYSTEMS AND METHODS

(75) Inventor: Robert R. Buckley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 2065 days.

(21) Appl. No.: 11/281,519

(22) Filed: Nov. 17, 2005

(65) Prior Publication Data

US 2007/0109319 A1    May 17, 2007

(51) Int. Cl.
*G09G 5/00*    (2006.01)

(52) U.S. Cl.
USPC .......................................... 345/582; 345/536

(58) Field of Classification Search
USPC .................................................. 345/536, 582
See application file for complete search history.

(56) References Cited

U.S. PATENT DOCUMENTS

| 2003/0113027 A1* | 6/2003 | Chan et al. | 382/240 |
| 2003/0165273 A1* | 9/2003 | Berkner et al. | 382/240 |
| 2005/0041873 A1* | 2/2005 | Ii | 382/232 |
| 2005/0041878 A1* | 2/2005 | Schwartz et al. | 382/251 |
| 2006/0176305 A1* | 8/2006 | Arcas et al. | 345/428 |
| 2007/0222782 A1* | 9/2007 | Solecki | 345/428 |

OTHER PUBLICATIONS

Author: Robert Buckley et al.; Title: JPEG 2000 Part 6 FCD 15444-6 Date: Nov. 16, 2001; p. 12.*
David Taubman et al., "JPEG 2000 Image Compression Fundamentals, Standards and Practice", Kluwer Academic Publishers, 2002.

* cited by examiner

*Primary Examiner* — Maurice L McDowell, Jr.
(74) *Attorney, Agent, or Firm* — Gibb & Riley, LLC

(57) ABSTRACT

Embodiments herein receive and fragment image data into image data fragments. Each single image data fragment comprises a complete, but lower resolution/quality image. The image data fragments are stored in different hardware devices, and a fragment table that comprises pointers from one image data fragment to locations of additional data image fragments is maintained. The first image data fragment is combined with one or more additional data fragments to produce a higher resolution/quality image.

20 Claims, 2 Drawing Sheets

FRAGMENTING IMAGE FILES SYSTEMS AND METHODS

BACKGROUND

Embodiments herein generally relate to systems and methods that provide lower resolution/quality images and access to higher resolution/quality images.

In the wake of rapidly increasing demand for network, multimedia, database and other digital capacity, many multimedia coding and storage schemes have evolved. One of the well known file formats for encoding and storing image data is JPEG 2000 (ISO/IEC 15444), incorporated herein by reference, developed by Joint Photographic Experts Group (JPEG) (see David Taubman et al., "JPEG 2000 Image Compression Fundamentals, Standards and Practice", Kluwer Academic Publishers, 2002, incorporated herein by reference). The JPEG 2000 image file format allows for fragmented codestreams (or image data).

The JPEG 2000 standard allows fragmenting the codestream between one or more files. One feature of the JPX file format, the JPEG2000 extended file format, specified in Part 2 of the JPEG2000 standard, is the ability to fragment a single codestream within a single file or across multiple files. This allows applications to implement such features as: edit an image, resaving the changed tiles to the end of the file; distribute the image across several disks for faster access; distribute the image across the Internet, allowing only certain customers access to the high quality or high resolution portions of the codestream; and reuse of headers from within a codestream across multiple codestreams (to minimize file overhead when storing similar codestreams within the same JPX file).

The JPEG 2000 file format resembles the capabilities offered by tile offsets in a TIFF file. The appropriate TIFF editor can retrieve a tile, edit it, append it to the file and then update the tile offset table so that it points to the revised & edited tile instead of the original tile. The JPEG 2000 image file format uses a similar mechanism, called fragment tables. Like a TIFF offset table, a fragment table contains an offset into the file where the data fragment can be found. Unlike TIFF however, the fragment table may also contain a data reference that points to an external file. This means that the fragment can be in a separate file that is stored locally or remotely. Also, the JPEG2000 fragments may not be tiles, that is non-overlapping rectangular spatial subsets of the image data. JPEG2000 fragments may be other subsets of the image, such as resolution or quality subsets of the image.

Conventional systems store an entire image in one place, since an image is basically one large pile of bits. Until JPEG 2000 came along, there was little or no alternative to going to the same location in memory, on a disk or over the Internet to retrieve any part of the image, no matter how small or large. If only a thumbnail was desired for previewing the full image, it had to be created separately then linked for example to the full size original in case the user wanted to access the entire image.

SUMMARY

A method embodiment herein receives a fragmented image and/or fragments image data into image data fragments. The method can store the image data fragments in different hardware devices and maintain a fragment table comprising pointers. In one example, a first image data fragment thumbnail can be located on a first hardware device with the table, and a second image data fragment can be located on a second hardware device separate from the first hardware device and potentially connected to the first hardware device by a network.

The lower resolution/quality image can be used as a thumbnail image. Each different data fragment produced by the fragmenting process comprises an additional layer of image resolution/quality that adds to the thumbnail. The lowest quality is a full size image, that is not a thumbnail in the traditional sense, but instead, includes a limited number of bits and is therefore, lower quality. The method combines the first image data fragment with one or more additional data fragments to produce a higher resolution/quality image. Therefore, rather than having separate thumbnail and high resolution/quality images, the embodiments herein add resolution/quality layers to the lowest quality image. This decreases storage requirements and eliminates the need to create two separate images (thumbnail and high-quality/resolution images) that are needed conventionally.

A device embodiment comprises a first storage device that stores the lower resolution/quality first image data fragment thumbnail and table, and one or more second storage devices that store the second image data fragments. One embodiment uses a fragment device (e.g., "fragmentor") that is connected to the first storage device and the second storage device, to fragment image data into the first image data fragment and the second image data fragment. The fragment table contains the pointers from the file with the first image data fragment to locations of all the second image data image fragment(s). Further, the device embodiment provides a combiner unit that is connected to the first storage device and the second storage device by, for example, a network or internal wiring of a device. The combiner is used to combine the first image data fragment with the second image data fragment(s) to produce the higher resolution/quality image.

These and other features are described in, or are apparent from, the following detailed description.

BRIEF DESCRIPTION OF THE DRAWINGS

Various exemplary embodiments of the systems and methods described in detail below, with reference to the attached drawing figures, in which.

DETAILED DESCRIPTION

As mentioned above, with applications such as JPEG 2000, image data fragments (e.g., wavelength compressed image data) can be maintained in separate files that are stored locally or remotely. Conventionally, if one desired to utilize thumbnail images for previewing full images, the thumbnail had to be created and separately linked, for example, to the full size original image file. The embodiments disclosed herein provide a methodology that allows one image fragment to serve as the thumbnail and that combines additional fragments with the thumbnail to increase the resolution/quality. This eliminates the necessity to provide one full-sized image file and a separate lower resolution thumbnail, with a link between the two.

Thus, this disclosure presents a method that uses or receives output from the JPEG 2000 image file format capability (as well as all other similar non-JPEG 2000 formatting capabilities, whether now known or developed in the future) to fragment an image codestream and store the fragments in multiple places. The fragments can be within the original file, where each fragment is addressable by an offset, outside the file where each fragment is addressable by a URL and an offset, or a combination of both. The method takes an encoded image, fragments it by resolution level, quality layer, etc., stores the first resolution level or quality layer in a small, local file on a local drive, USB thumb drive, or any other type of storage medium, and then stores the remaining resolution levels on a remote disk or over a network such as a LAN, or over the Internet. The local file contains a fragment table that points to the remaining levels or layers, which can be retrieved as needed. So for example, a user can carry around a thumb drive full of "thumbnail" files with only first resolution levels of selected images. These files also contain fragment tables that point to the remaining resolution levels for reconstructing the full image. The remaining levels can be stored remotely and accessible over the Internet. These thumbnails are in effect image tokens.

Figure 1:
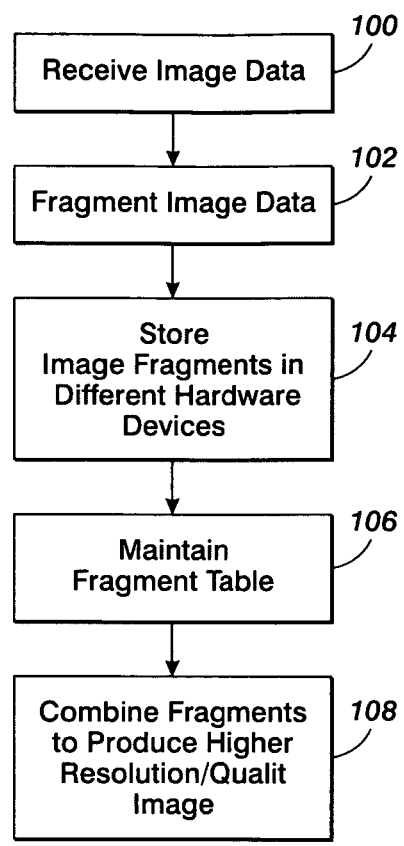
FIG. 1 is a flowchart representation of embodiments herein.

As shown in flowchart form in FIG. 1, one method embodiment herein receives (100) and fragments image data into image data fragments (102). A first of the image data fragments comprises a complete, but lower resolution/quality image. The remaining fragments (second fragments) may or may not comprise complete images in themselves, but instead comprise additional quality/resolution components that can be added to the thumbnail image.

The method can, in some embodiments, store the image data fragments in different hardware devices (104) and maintain a fragment table comprising pointers from the file containing the first thumbnail image data fragment to locations of all additional data image fragments (106). In one example, a first image data fragment (thumbnail) and table can be located on a first hardware device, and a second image data fragment can be located on a second hardware device separate from the first hardware device and potentially connected to the first hardware device by a network.

With the embodiments herein, when a previously fragmented image is copied, the file with just the first fragment is copied and the fragment table is also copied and updated to point to the other fragments, which are left behind in the original file, potentially without altering the original file. Other operations enabled include that when an image is requested, just the token (first image data fragment) is transferred; with an email image, only the token is attached; when printing an image, the token is sent to the printer, the rest of the image is retrieved automatically as part of reading the file.

Thus, in one embodiment, the method starts with or receives a first file of an image that has been previously fragmented. The first file includes a fragmented image made up of a first image data fragment and second image data fragments, as well as a table containing pointers to the first image data fragment and to the second image data fragments. Then, the method copies only the first image data fragment and the table to a second file. This allows the method to combine at least one of the second image data fragments with the first image data fragment, using the table in the second file, to produce an image having a higher resolution than the first image data fragment alone.

The lower resolution/quality image can be used as a thumbnail image/image token. Each different data fragment forms an additional layer of image resolution/quality that can be added to the first fragment (thumbnail). The method combines the first image data fragment with one or more additional data fragments to produce a higher resolution/quality image (108). Therefore, rather than having separate thumbnail and high resolution/quality images, the embodiments herein add resolution/quality layers to the first fragment thumbnail image. This decreases storage requirements and eliminates the need to create two separate images (thumbnail and high-quality/resolution images) that are needed conventionally.

Figure 2:
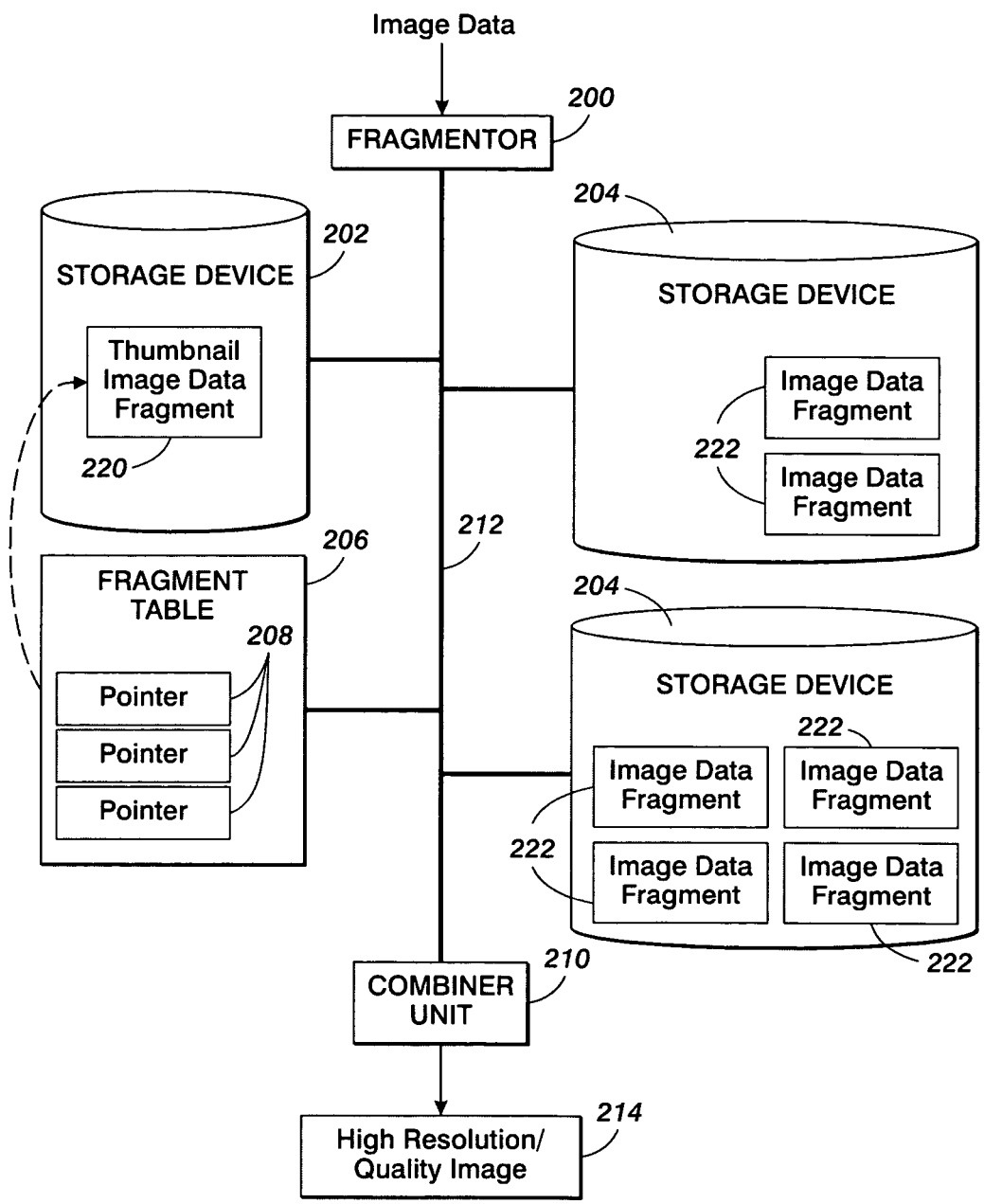
FIG. 2 is a schematic representation of device embodiments.

A device embodiment (shown in FIG. 2) comprises a first storage device 202 that stores the lower resolution/quality first image data fragment 220 and one or more second storage devices 204, 214 that each store one or more second image data fragments 222, 224. Item 222 represents all the remaining second image data fragments after the first thumbnail data fragment and items 224 represent individual second data fragments. This embodiment uses a fragment device (e.g., "fragmentor") 200 that is connected to the first storage device and the second storage device, to fragment image data into the first image data fragment and the second image data fragments. The fragmentor 200 comprises any conventional logical device (such as a computer) that has the capability to operate JPEG 2000 or similar non-JPEG 2000 software.

A fragment table 206 contains the pointers 208 from the file containing first image data fragment 202 to locations of the first image data fragment 220 and all the second image data image fragment(s) 222, 224. Further, the device embodiment provides a combiner unit 210 that is operatively connected to the first storage device 202 and the second storage device(s) 204, 214 by, for example, a wired or wireless network or internal wiring of a device 212. The combiner 210 is used to combine the first image data fragment 220 with at least one of the second image data fragment(s) 222, 224 to produce the higher resolution image 234. The fragment table 206 can be located as a separate file within the storage device 202, can be contained within the thumbnail image data fragment file 220 (as shown by the dashed line in FIG. 2), can be contained within the storage device 204 that stores all data fragments 220, 222, or be stored separately therefrom, so long as the fragment table 206 is accessible to the combiner unit 210 to allow the combiner unit 210 to locate the additional image data fragments when forming the higher resolution/quality image 234.

As mentioned above, the JPEG 2000 image file format and other similar file formats allow for fragmented codestreams (or image data). As originally described, JPEG 2000 resembles the capabilities offered by tile offsets in a TIFF file. The appropriate TIFF editor can retrieve a tile, edit it, append it to the file and then update the tile offset table so that it points to the revised and edited tile instead of the original tile. The JPEG 2000 image file format uses a similar mechanism, called fragment tables. Like a TIFF offset table, a fragment table contains an offset into the file where the data fragment can be found. Unlike TIFF however, the fragment table also contains a data reference table that points to an external file. This means that the fragment can be in a separate file that is stored locally or remotely. (If the data reference is 0, then the fragment is in the same file as the fragment table that points to it.)

Using one simplified example for a JPEG 2000-encoded image, a user can be asked if he or she wants to create an image token. If so, then the first resolution level is retrieved and stored locally in a token file that contains a fragment table that points to all the remaining resolution levels. While this description uses resolution levels and quality layers, it could just as easily use any other aspects of the image that can be fragmented. This token can then be used for a variety of purposes, such as inserting in a document, carrying around on a thumb drive, attaching to a mail file, or publishing on the web for friends and family to access. In all these cases, accessing the token gives the option of downloading more resolution levels, up to the number of levels for which access is approved or appropriate.

Thus, the embodiments disclosed herein provide a methodology that allows one image fragment to serve as the thumbnail or other surrogate and that combines additional fragments with the thumbnail to increase the resolution/quality. This eliminates the necessity to provide one full-sized image file and a separate lower resolution thumbnail, with a link between the two.

It will be appreciated that the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A device-implemented method comprising:
   receiving image data into a fragmentor device;
   fragmenting said image data into a first image data fragment and second image data fragments, using said fragmentor device;
   storing, in a first file on a first hardware storage device, only said first image data fragment and a table;
   storing said second image data fragments in at least one second file on a second hardware storage device separate from said first hardware storage device, wherein said table of said first file comprises pointers pointing to locations of said second image data fragments in said second file; and
   combining at least one of said second image data fragments with said first image data fragment to produce an image.

2. The method according to claim 1, wherein said second hardware storage device is operatively connected to said first hardware storage device by a network.

3. The method according to claim 1, wherein said image data comprises wavelength compressed image data.

4. The method according to claim 1, wherein each of said second image data fragments comprises an increment of image resolution.

5. The method according to claim 1, wherein said combining comprises combining all of said second image data fragments with said first image data fragment to form a complete image.

6. A device-implemented method comprising:
   receiving a complete image into a fragmentor device;
   fragmenting said complete image into image data fragments, using said fragmentor device;
   maintaining a first file on a first hardware storage device, said first file comprising only a fragment table and a first image data fragment, of said image data fragments;
   storing additional image data fragments, of said image data fragments, in different hardware devices separate from said first hardware storage device maintaining said first file, wherein said fragment table of said first file comprises pointers pointing to locations of all said additional image data fragments located in said different hardware devices; and
   combining at least one of said additional image data fragments with said first image data fragment to produce an image having a higher resolution than said first image data fragment alone.

7. The method according to claim 6, wherein said different hardware devices are operatively connected to said first hardware storage device by a network.

8. The method according to claim 6, wherein said first image data fragment comprises a thumbnail image.

9. The method according to claim 6, wherein each of said additional data fragments comprises a layer of image resolution.

10. The method according to claim 6, wherein said combining comprises combining all of said additional image data fragments with said first image data fragment to form said complete image.

11. A device comprising:
    a first storage device storing a first file comprising only a first image data fragment and a table comprising pointers to locations of second image data fragments;
    at least one second storage device storing at least one of said second image data fragments in a second file separate from said first file, wherein said pointers in said table of said first file point to locations of said second image data fragments within said second file; and
    a combiner operatively connected to said first storage device and said second storage device,
    wherein said combiner is adapted to combine said first image data fragment with at least one of said second image data fragments to produce an image.

12. The device according to claim 11, further comprising a fragmentor connected to said first storage device and said second storage device, wherein said fragmentor is adapted to fragment image data into said first image data fragment and said second image data fragments.

13. The device according to claim 11, further comprising a network connecting said first storage device, said second storage device, and said combiner.

14. The device according to claim 11, wherein said first image data fragment comprises a thumbnail image.

15. The device according to claim 11, wherein each of said second image data fragments comprises a layer of image resolution.

16. A device comprising:
    a fragmentor adapted to fragment a complete image into a first image data fragment and second image data fragments;
    a first storage device storing a first file comprising only said first image data fragment and a table comprising pointers to locations of all said second image data fragments;
    at least one second storage device storing at least one of said second image data fragments in a second file separate from said first file, wherein said pointers in said table of said first file point to locations of said second image data fragments within said second file; and
    a combiner operatively connected to said first storage device and said second storage device,
    wherein said combiner is adapted to combine said first image data fragment with at least one of said second image data fragments to produce an image having a higher resolution than said first image data fragment alone.

17. The device according to claim 16, further comprising a network connecting said first file storage device, said second file storage device, and said combiner.

18. The device according to claim 16, wherein each of said second image data fragments comprises a layer of image resolution.

19. The device according to claim 16, wherein when said combiner combines all of said second image data fragments with said first image data fragment, said combiner forms said complete image.

20. A device-implemented method comprising:

receiving, into a first hardware storage device, a first file comprising a fragmented image comprising a first image data fragment and second image data fragments, wherein said first file further comprises a table having pointers to said first image data fragment and to said second image data fragments;

storing only said first image data fragment and said table in a second file on a second hardware storage device, wherein said first hardware storage device is separate from said second hardware storage device such that said pointers in said table of said second file point to locations of said second image data fragments within said first file within said first hardware storage device; and combining at least one of said second image data fragments with said first image data fragment, using said second file, to produce an image.

* * * * *